United States Patent
Yamashita (10) Patent No.: US 6,470,196 B1
(45) Date of Patent: Oct. 22, 2002

(54) PORTABLE COMMUNICATION APPARATUS (75) Inventor: Masayoshi Yamashita, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/414,606

(22) Filed: Oct. 8, 1999

(30) Foreign Application Priority Data

Oct. 9, 1998 (JP) .......................................... 10-303396

(51) Int. Cl.$^7$ .............................................. H04M 1/00
(52) U.S. Cl. ....................... 455/567; 455/550; 455/575; 455/458; 379/458
(58) Field of Search ................................. 455/567, 550, 455/575, 458; 379/418

(56) References Cited

U.S. PATENT DOCUMENTS

| | | | |
|---|---|---|---|
| 5,583,919 A | | 12/1996 | Talvard et al. |
| 5,758,280 A | * | 5/1998 | Kimura ....................... 455/412 |
| 5,867,796 A | * | 2/1999 | Inutsuka ..................... 455/567 |
| 5,930,352 A | * | 7/1999 | Hiraiwa ...................... 379/367 |
| 5,960,367 A | * | 9/1999 | Kita ........................... 455/567 |
| 5,966,671 A | * | 10/1999 | Mitchell ..................... 455/575 |
| 6,058,164 A | * | 4/2000 | Ibuka ......................... 379/67.1 |
| 6,118,979 A | * | 9/2000 | Powell ....................... 455/31.2 |
| 6,119,022 A | * | 9/2000 | Osborne ..................... 455/567 |
| 6,151,485 A | * | 11/2000 | Crisp .......................... 455/90 |
| 6,253,075 B1 | * | 6/2001 | Beghtol ...................... 455/415 |
| 6,275,690 B1 | * | 8/2001 | Higuchi ...................... 455/412 |
| 6,285,891 B1 | * | 9/2001 | Hoshino ..................... 455/567 |

FOREIGN PATENT DOCUMENTS

| | | |
|---|---|---|
| EP | 0740449 A2 | 10/1996 |
| EP | 0740449 A3 | 9/1998 |
| GB | 2331670 A | 5/1999 |
| JP | 3-45057 | 2/1991 |
| JP | 7-203526 | 8/1995 |
| JP | 9-74435 | 3/1997 |
| JP | 10-107874 | 4/1998 |
| JP | 10-45460 | 5/1998 |
| JP | 10-215299 | 9/1998 |

OTHER PUBLICATIONS

British Search Report dated Jun. 12, 2000.
Japanese Office Action dated Sep. 21, 1999, with partial translation.
European Search Report dated Mar. 28, 2000.

* cited by examiner

Primary Examiner—William Trost
Assistant Examiner—Marcos Torres
(74) Attorney, Agent, or Firm—McGinn & Gibb, PLLC

(57) ABSTRACT

A portable communication apparatus which can atop the alert indicating the occurrence of an incoming call while holding the incoming call is disclosed. A silence function is assigned to at least one key for an alert operation mode. When starting an alert due to an incoming call, the alert is stopped while holding the incoming call when a key having the silence function assigned thereto is operated. A response function in assigned to at least one of the plurality of keys for an alert stopped mode. The response to the incoming call held is performed when a key having the response function assigned thereto is operated.

2 Claims, 11 Drawing Sheets

| PHYSICAL KEY \ MODE | STAND BY STATE | INCOMING-CALL STATE | | | ... |
|---|---|---|---|---|---|
| | | QUICK-SILENCE FUNCTION ON | | ANY-KEY ANSWER FUNCTION ON | |
| | | AUDIBLE ALERT | AFTER STOPPING ALERT | | |
| LEFT-ARROW KEY 201 | — | SILENCE KEY | — | RESPONSE KEY | |
| CENTER KEY 202 | MENU KEY | | | | |
| RIGHT-ARROW KEY 203 | — | SILENCE KEY | — | RESPONSE KEY | |
| BACK-TRACK KEY 204 | — | SILENCE KEY | — | RESPONSE KEY | |
| VOICE KEY 206 | VOICE SEARCH KEY | SILENCE KEY | — | RESPONSE KEY | |
| POWER KEY 207 | POWER KEY | | | | |
| MANNER KEY 208 | MANNER MODE KEY | MANNER MODE+MESSAGE KEY | | | |
| START KEY 209 | CALLING KEY | RESPONSE KEY | | | |
| RADIAL KEY 210 | REDIAL KEY | SILENCE KEY | — | RESPONSE KEY | |
| END KEY 211 | — | RESPONSE HOLD KEY | | | |
| NUMERAL KEYS 0-9 ⎫ | NUMERAL KEY | SILENCE KEY | — | RESPONSE KEY | |
| * KEY  ⎬ 205 | * KEY | SILENCE KEY | — | RESPONSE KEY | |
| # KEY  ⎭ | # KEY | SILENCE KEY | — | RESPONSE KEY | |

(a) STAND BY SCREEN (b) QUICK-SILENCE ON OFF

(c) QUICK-SILENCE ON OFF (d) STAND BY SCREEN

| PHYSICAL KEY \ MODE | STAND BY STATE | INCOMING-CALL STATE | | | ... |
|---|---|---|---|---|---|
| | | QUICK-SILENCE FUNCTION ON | | ANY-KEY ANSWER FUNCTION ON | |
| | | AUDIBLE ALERT | AFTER STOPPING ALERT | | |
| LEFT-ARROW KEY 201 | — | SILENCE KEY | — | RESPONSE KEY | |
| CENTER KEY 202 | | MENU KEY | | | |
| RIGHT-ARROW KEY 203 | | — | — | RESPONSE KEY | |
| BACK-TRACK KEY 204 | | — | — | RESPONSE KEY | |
| VOICE KEY 206 | VOICE SEARCH KEY | | — | RESPONSE KEY | |
| POWER KEY 207 | | POWER KEY | | | |
| MANNER KEY 208 | MANNER MODE KEY | MANNER MODE+MESSAGE KEY | | | |
| START KEY 209 | CALLING KEY | RESPONSE KEY | | RESPONSE KEY | |
| RADIAL KEY 210 | REDIAL KEY | | — | RESPONSE KEY | |
| END KEY 211 | — | RESPONSE HOLD KEY | | | |
| NUMERAL KEYS 0-9 ⎫ | NUMERAL KEY | — | | RESPONSE KEY | |
| * KEY            ⎬ 205 | * KEY | — | | RESPONSE KEY | |
| # KEY            ⎭ | # KEY | — | | RESPONSE KEY | |

FIG.8

| MODE<br>PHYSICAL KEY | STAND BY STATE | INCOMING-CALL STATE | | | ... |
|---|---|---|---|---|---|
| | | QUICK-SILENCE FUNCTION ON | | ANY-KEY ANSWER FUNCTION ON | |
| | | AUDIBLE ALERT | AFTER STOPPING ALERT | | |
| LEFT-ARROW KEY 201 | — | SILENCE KEY | — | RESPONSE KEY | |
| CENTER KEY 202 | MENU KEY | SILENCE KEY | MENU KEY | | |
| RIGHT-ARROW KEY 203 | — | SILENCE KEY | — | RESPONSE KEY | |
| BACK-TRACK KEY 204 | — | SILENCE KEY | — | RESPONSE KEY | |
| VOICE KEY 206 | VOICE SEARCH KEY | SILENCE KEY | — | RESPONSE KEY | |
| POWER KEY 207 | POWER KEY | SILENCE KEY | POWER KEY | | |
| MANNER KEY 208 | MANNER MODE KEY | SILENCE KEY | MANNER MODE+MESSAGE KEY | | |
| START KEY 209 | CALLING KEY | RESPONSE KEY | | | |
| RADIAL KEY 210 | REDIAL KEY | SILENCE KEY | — | RESPONSE KEY | |
| END KEY 211 | — | SILENCE KEY | RESPONSE HOLD KEY | | |
| NUMERAL KEYS 0-9 } 205 | NUMERAL KEY | SILENCE KEY | — | RESPONSE KEY | |
| * KEY | * KEY | SILENCE KEY | — | RESPONSE KEY | |
| # KEY | # KEY | SILENCE KEY | — | RESPONSE KEY | |

FIG.9

| PHYSICAL KEY \ MODE | STAND BY STATE | INCOMING-CALL STATE | | | ... |
|---|---|---|---|---|---|
| | | QUICK-SILENCE FUNCTION ON | | ANY-KEY ANSWER FUNCTION ON | |
| | | AUDIBLE ALERT | AFTER STOPPING ALERT | | |
| LEFT-ARROW KEY 201 | — | SILENCE KEY | — | RESPONSE KEY | |
| CENTER KEY 202 | MENU KEY | SILENCE KEY | MENU KEY | | |
| RIGHT-ARROW KEY 203 | — | SILENCE KEY | — | RESPONSE KEY | |
| BACK-TRACK KEY 204 | — | SILENCE KEY | — | RESPONSE KEY | |
| VOICE KEY 206 | VOICE SEARCH KEY | SILENCE KEY | — | RESPONSE KEY | |
| POWER KEY 207 | POWER KEY | SILENCE KEY | POWER KEY | | |
| MANNER KEY 208 | MANNER MODE KEY | SILENCE KEY | MANNER MODE+MESSAGE KEY | | |
| START KEY 209 | CALLING KEY | SILENCE KEY | RESPONSE KEY | | |
| RADIAL KEY 210 | REDIAL KEY | SILENCE KEY | — | RESPONSE KEY | |
| END KEY 211 | — | SILENCE KEY | RESPONSE HOLD KEY | | |
| NUMERAL KEYS 0-9 ⎫ | NUMERAL KEY | SILENCE KEY | — | RESPONSE KEY | |
| * KEY  ⎬ 205 | * KEY | SILENCE KEY | — | RESPONSE KEY | |
| # KEY ⎭ | # KEY | SILENCE KEY | — | RESPONSE KEY | |

FIG.10

| PHYSICAL KEY \ MODE | STAND BY STATE | INCOMING-CALL STATE | | |
|---|---|---|---|---|
| | | QUICK-SILENCE FUNCTION ON | | ANY-KEY ANSWER FUNCTION ON |
| | | AUDIBLE ALERT | AFTER STOPPING ALERT | |
| LEFT-ARROW KEY 201 | — | SILENCE KEY | | RESPONSE KEY |
| CENTER KEY 202 | — | MENU KEY | | |
| RIGHT-ARROW KEY 203 | — | SILENCE KEY | | RESPONSE KEY |
| BACK-TRACK KEY 204 | — | SILENCE KEY | | RESPONSE KEY |
| VOICE KEY 206 | VOICE SEARCH KEY | SILENCE KEY | | RESPONSE KEY |
| POWER KEY 207 | POWER KEY | | | |
| MANNER KEY 208 | MANNER MODE KEY | MANNER MODE→MESSAGE KEY | | |
| START KEY 209 | CALLING KEY | | RESPONSE KEY | |
| RADIAL KEY 210 | REDIAL KEY | SILENCE KEY | | RESPONSE KEY |
| END KEY 211 | — | RESPONSE HOLD KEY | | |
| NUMERAL KEYS 0-9 (205) | NUMERAL KEY | SILENCE KEY | | RESPONSE KEY |
| * KEY (205) | * KEY | SILENCE KEY | | RESPONSE KEY |
| # KEY (205) | # KEY | SILENCE KEY | | RESPONSE KEY |
| ⋮ | | | | ⋮ |

FIG.11

| PHYSICAL KEY \ MODE | STAND BY STATE | INCOMING-CALL STATE | | | |
|---|---|---|---|---|---|
| | | QUICK-SILENCE FUNCTION ON | | ANY-KEY ANSWER FUNCTION ON | |
| | | AUDIBLE ALERT | AFTER STOPPING ALERT | | |
| LEFT-ARROW KEY 201 | — | SILENCE KEY | | RESPONSE KEY | ⋯ |
| CENTER KEY 202 | MENU KEY | | RESPONSE KEY | MENU KEY | |
| RIGHT-ARROW KEY 203 | — | SILENCE KEY | | RESPONSE KEY | |
| BACK-TRACK KEY 204 | — | SILENCE KEY | | RESPONSE KEY | |
| VOICE KEY 206 | VOICE SEARCH KEY | SILENCE KEY | | RESPONSE KEY | |
| POWER KEY 207 | POWER KEY | | RESPONSE KEY | POWER KEY | |
| MANNER KEY 208 | MANNER MODE KEY | MANNER MODE+MESSAGE KEY | RESPONSE KEY | MANNER MODE+MESSAGE KEY | |
| START KEY 209 | CALLING KEY | | RESPONSE KEY | | |
| RADIAL KEY 210 | REDIAL KEY | SILENCE KEY | | RESPONSE KEY | |
| END KEY 211 | — | RESPONSE HOLD KEY | RESPONSE KEY | RESPONSE HOLD KEY | |
| NUMERAL KEYS 0-9 }205 | NUMERAL KEY | SILENCE KEY | | RESPONSE KEY | |
| * KEY | * KEY | SILENCE KEY | | RESPONSE KEY | |
| # KEY | # KEY | SILENCE KEY | | RESPONSE KEY | |

PORTABLE COMMUNICATION APPARATUS

BACKGROUND OF THE INVENTION

1. Field of the Invention

The present invention relates to a portable communication apparatus such as a mobile telephone or the like, and more particularly, to a portable communication apparatus having a function of informing a user carrying the same of occurrence of an incoming call.

2. Description of Related Art

A portable telephone is a typical mobile communication apparatus. In general, the portable telephone is provided with an alert device for informing the user, by sound and/or silent vibration, of the occurrence of an incoming call. The user can select one or both of the audible alert and the vibration alert.

In the case where only the silent vibration alert has been selected, however, the user cannot be informed without having such a portable telephone on his/her person or making physical contact with it. Therefore, when the portable telephone is put in a bag or the like, the silent vibration alert is made in vain. To avoid such a case, many users select the audible alert.

In the case where the audible alert has been selected, however, a sounder sounds alert tone when an incoming call occurs, making a nuisance of itself. As a function of stopping the audible alert as soon as possible, an Any-key answer function has been proposed in Japanese Patent Application Laid-open Publication No. 10-107874. The Any-key answer function stops the sounder and start communication by the user depressing not only a start key but also any key of ten keys, 0–9, symbol keys (*, #) and other keys. Therefore, the user can stop the sounder without looking at the keypad provided in the portable telephone, resulting in rapid alert stop.

The portable telephone disclosed in the above Japanese Patent Application Laid-open Publication No. 10-107874 also provides another useful function called a response hold function. The response hold function is useful in the case where the user cannot respond to an incoming call immediately. More specifically, when an end key is depressed on incoming call, the sounder is stopped and the portable telephone sends a caller a message such that the called party cannot respond to this call immediately, and the caller is put on hold. When a start key is depressed, the telephone communication can be made.

However, according to the above-described conventional portable telephone, when the user depresses any key in the Any-key answer mode, the audible alert is stopped and, at the same time the portable telephone responds to the incoming call to be set to the communication mode. This would cause the calling party to start talking. If the calling party receives silence from the called party, the calling party may determine that some failure occurs and then is likely to disconnect the established line. To avoid such disconnection, the called party must start conversation, which will conversely make a nuisance of itself.

On the other hand, the response hold function provides transmission of a message that the called party cannot respond to this call immediately. Therefore, it is not necessary to start conversation immediately. However, there is a strong possibility that the calling party promptly disconnects the call because it is determined that it makes a nuisance of itself or partly because it cannot be determined how long the calling party is kept waiting. When the called party depresses the start key, the incoming call would be disconnected already.

SUMMARY OF THE INVENTION

It is an object of the present invention to provide a portable communication apparatus and a control method that can stop an alert indicating an incoming call so that the calling party does not disconnect the call.

According to an aspect of the present invention, a portable communication apparatus includes an alert device for producing an alert when an incoming call occurs and an input device having a plurality of keys. The alert device producing the alert is controlled to stop the alert while holding the incoming call depending on a first predetermined operation of the input device.

The portable communication apparatus is capable of responding to the incoming call held when a second predetermined operation of the input device is performed after the first predetermined operation.

According to another aspect of the invention, a portable communication apparatus further includes a key function changer for changing logical functions of the plurality of keys based on a predetermined rule depending on a change in operation mode of the portable communication apparatus. The alert device producing the alert is controlled to stop the alert while holding the incoming call when a key having a predetermined logical function is operated.

The key function changer preferably includes a memory storing a table of correspondence between the plurality of keys and a plurality of logical functions for an alert operation mode. Referring to the table, it is determined whether the key having the predetermined logical function is operated.

Preferably, a plurality of keys have the predetermined logical function assigned thereto. All the keys may have the predetermined logical function assigned thereto. All the keys other than a predetermined key may have the predetermined logical function assigned thereto and the predetermined key has a logical function of responding to the incoming call assigned thereto. Further, all the keys other than a plurality of predetermined keys may have the predetermined logical function assigned thereto and the respective predetermined keys have a logical function of responding to the incoming call assigned thereto. Alternatively, a single key may have the predetermined logical function assigned thereto.

The key function changer preferably includes a first memory for storing function setting data Including a quick-silence function flag and a second memory storing a table of correspondence between the plurality of keys and a plurality of logical functions for each of an alert operation and alert stopped modes in a case where the quick-silence function flag is set. Referring to the function setting data and the table, it is determined whether the key having the predetermined logical function is operated.

According to further another aspect of the present invention, a control method for a portable communication apparatus including an input device having a plurality of keys, includes the steps of: assigning a silence function to at least one of the plurality of keys for an alert mode; producing an alert when an Incoming call occurs; and stopping the alert while holding the incoming call when a key having the silence function assigned thereto is operated.

Further, the method preferably includes the step of: assigning a response function to at least one of the plurality of keys for an alert stopped mode; and responding to the incoming call hold when a key having the response function assigned thereto is operated.

As described above, according to the present invention, the alert indicating the occurrence of an incoming call can be stopped while holding the incoming call. Since the incoming call is maintained, the calling party continues to hear a ringing tone when the alert has been stopped at the called party, resulting in a reduced possibility that the calling party disconnects the call.

Further, in the case where a silence function is assigned to a plurality of keys, the alert can be stopped while holding the incoming call by depressing any of the silence keys, resulting in rapid alert stop.

Furthermore, in the case where a response (off-hook) function is assigned to a plurality of keys after the alert has been stopped, the response to the incoming call can be rapidly performed by depressing one of the plurality of response keys.

DETAILED DESCRIPTION OF THE PREFERRED EMBODIMENTS

Figure 1:
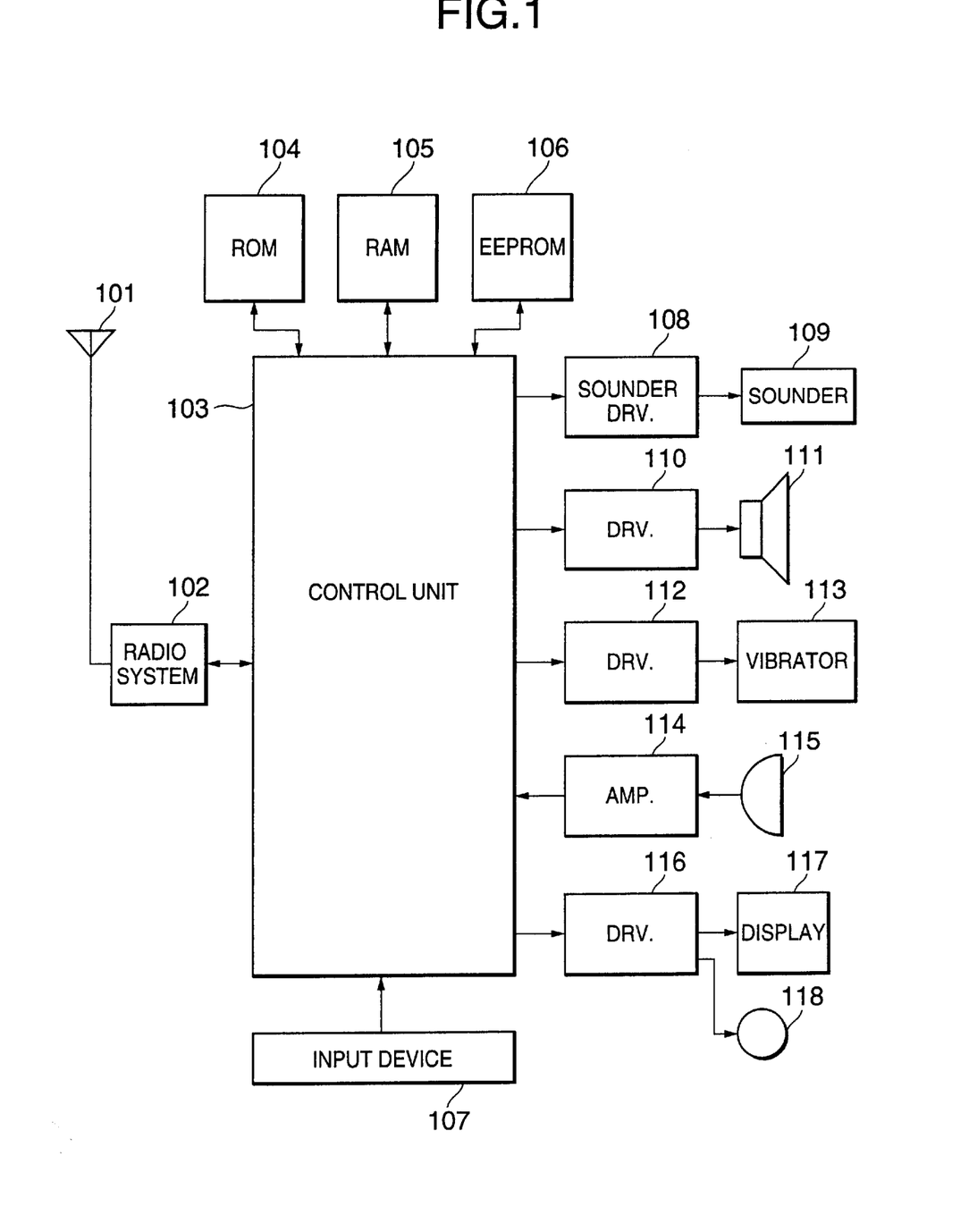
FIG. 1 is a schematic block diagram showing an internal circuit structure of a portable telephone as an embodiment of a portable communication apparatus according to the present invention.

Referring to FIG. 1, inside a portable telephone according to an embodiment of the present Invention, there are built an antenna 101, a radio system 102, a control unit 103, and other circuits as described below.

The antenna 101 is connected to the radio system 102, which performs transmission/reception of a radio signal under the control of the control unit 103 including a channel controller, a speech processor, and a microprocessor (CPU).

The control unit 103 controls the operations of the portable telephone using a read-only memory (ROM) 104, a random access memory (RAM) 105 and a non-volatile memory 106. The ROM 104 stores control programs, which run on the microprocessor of the control unit 103, and other necessary control data including a physical-logical key correspondence table as described later. The RAM 105 temporarily stores various kinds of data. The non-volatile memory 106 may be an electrically erasable programmable ROM (EEPROM), which stores function setting data and an identification number (here, the telephone number of its own).

Figure 2:
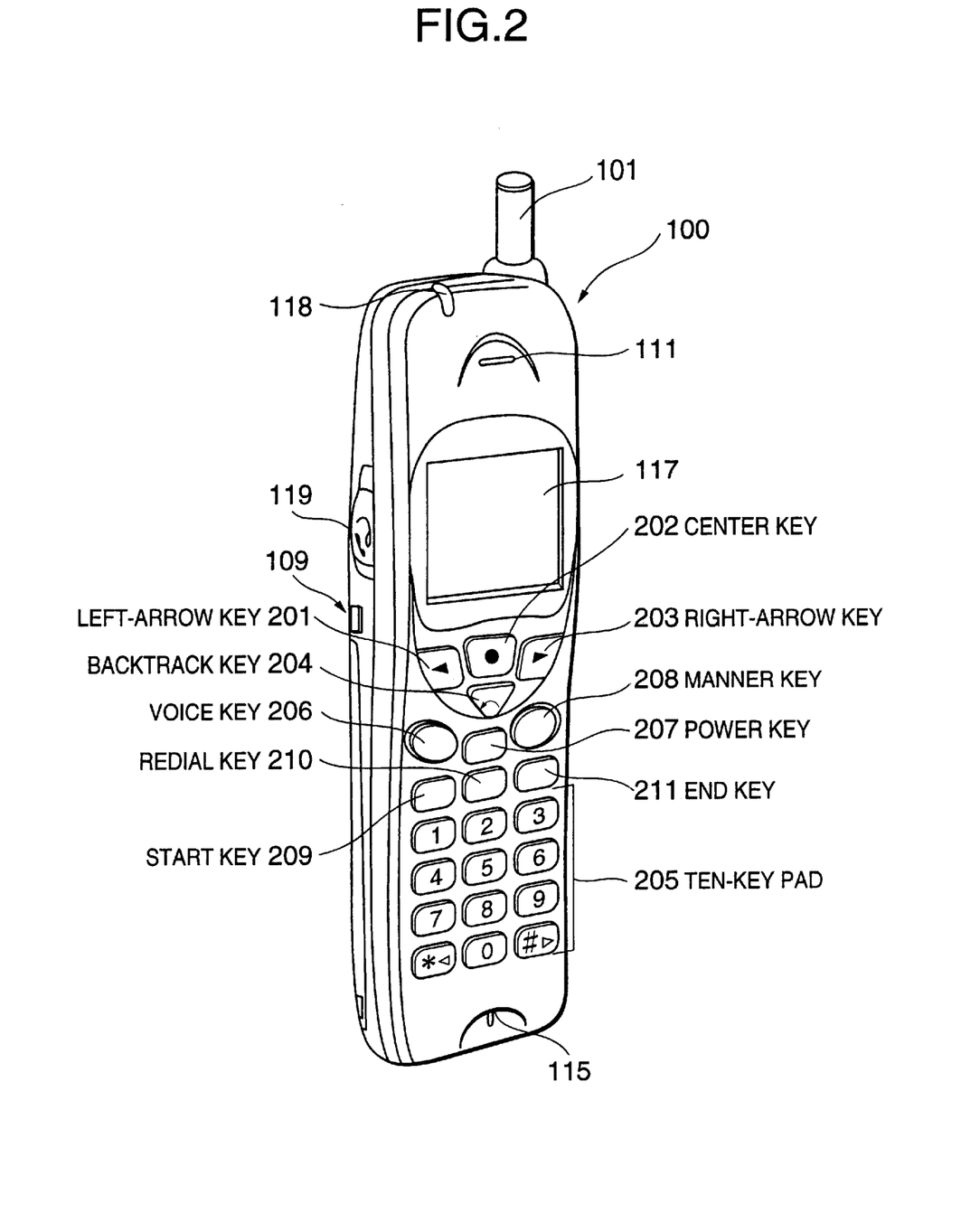
FIG. 2 is a perspective view of the portable telephone according to the present embodiment of FIG. 1.

A user's instruction is input by a user operating an input device 107 composed of a plurality of keys including numerical and symbol keys and other function keys (see FIG. 2). The portable telephone is provided with an alert device composed of a sounder and/or a silent vibrator. In this embodiment, the control unit 103 controls a sounder driver 108 to drive a sounder 109 so that an audible alert indicating occurrence of an incoming call is produced. Alternatively, the control unit 103 can be set to control a vibrator driver 112 to drive a vibrator 113 so that a silent alert indicating occurrence of an incoming call is produced. Both the sounder 109 and the vibrator 113 can be also driven to produce the audible and silent alerts when an incoming call occurs. The control unit 103 controls a speaker driver 110 to drive a speaker 111 so that the voice of the opposite party is produced. The control unit 103 receives the voice signal of the user from a microphone 115 through an amplifier 114. Further, the control unit 103 controls a display driver 116 to drive a display device 117 such as a liquid crystal display (LCD) and an incoming call Indicating lamp 118 such as a light-emitting diode. The incoming call indicating lamp 118 blinks as a visible alert when an incoming call occurs. It should be noted that a power supply circuit including a battery is not shown in this figure for simplicity.

Referring to FIG. 2, the portable telephone 100 has the antenna 101 and the incoming call indicating lamp 118 on the top thereof. The speaker 111, the microphone 115, the display 117 and the input device 107 are provided in the main surface of a housing of the portable telephone 100. The input device 107 has a layout of various keys 201–211. The sounder 109 is provided on the back side of the housing and an earphone-microphone jack 119 is provided in the side wall of the housing.

In this embodiment, the input device 107 is composed of a display operation keys: a left-arrow key 201, center key 202, right-arrow key 203, and backtrack key 204. The input device 107 is further composed of a ten-key pad 205 consisting of numerical keys 0–9 and symbol keys * and #, voice key 206, power key 207, manner key 208, start key 209, redial key 210 and end key 211. A total of 22 keys are provided in a predetermined layout.

When a physical key is depressed, the input device 107 outputs a key code identifying the depressed key to the control unit 103. The control unit 103 determines a logical key corresponding to the depressed physical key by referring to the physical-logical key correspondence table previously stored in the ROM 104. As described hereafter, a physical key serves as a logical key depending on the current operation mode.

Figure 3:
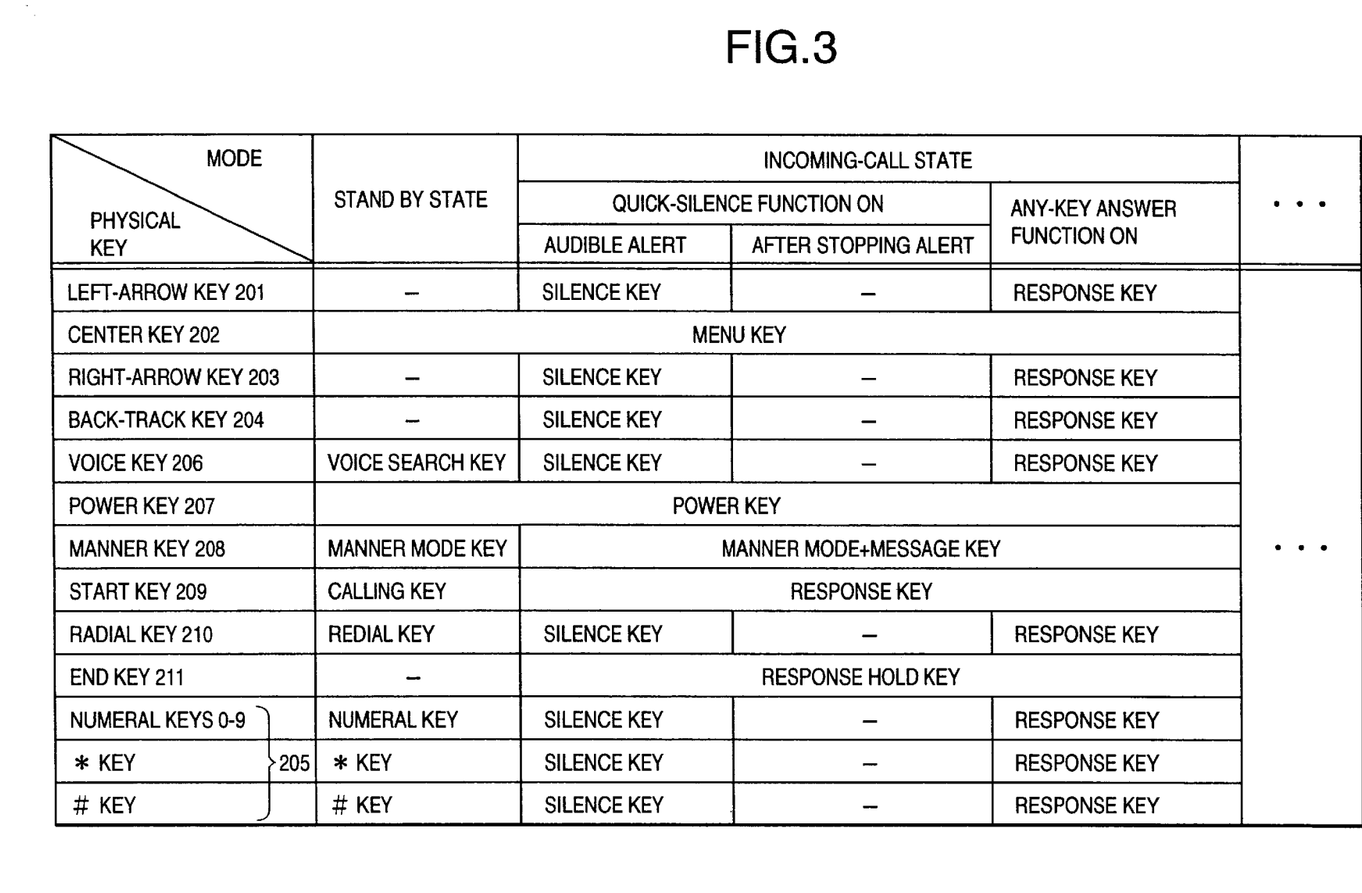
FIG. 3 is a diagram showing an example of a table for the correspondence of physical keys and logical keys according to a first embodiment of the present invention.

Referring to FIG. 3, a physical-logical key function correspondence table is previously stored In the ROM 104. Each of the physical keys 201–205 provided in the input device 107 as shown in FIG. 2 changes its operation role depending on an operation mode of the portable telephone. In this embodiment, the operation mode has standby state and incoming call state, the incoming call state having quick-silence function ON mode and any key answer function ON mode, and the quick-silence function ON mode having two states: audible-alert state and alert stop state. As shown in this figure, in the case where the audible alert is being produced by the sounder 109 in the quick-silence function ON state when an incoming call occurs, the control unit 103 logically sets the left-arrow key 201, the right-arrow key 203, the backtrack key 204, the voice key 206, the redial key 210, and the ten-key pad 205 for a silence key. Therefore, when the user depresses one of these keys 201, 203–206, and 210 in this audible alert state, the audible alert is stopped while holding the incoming call. The details of respective keys will be described hereinafter.

As shown in FIG. 3, the power key 207 functions as a power on/off key in any of the operation modes. More specifically, when the power key 207 is depressed for a duratlon of, for example, one second in the power-off state, the portable telephone is powered on and its operation mode becomes the standby state. On the contrary, when the power key 207 is depressed for a duration of, for example, two second in the power-on state, the portable telephone is powered off.

In the case of the standby state, the left-arrow key 201, the right-arrow key 203, the backtrack key 204 and the end key 211 do not function, which is referenced by "-" in FIG. 3. The other keys 202 and 205–210 function as logical keys, respectively. The ten-key pad 205 including numerical keys 0–9 and symbol keys * and # function as logical keys for inputting numerals 0–9 and the symbols * and # and the start key 209 functions as a calling key. Therefore, when the user operates the ten-key pad 205 to input a destination telephone number, the destination phone number is displayed on the display 117. After checking the displayed phone number, the user depresses the start key 209 to dial. The radial key 210, which is a well-known function key, is used to read the previously dialed phone number to display it on the display 117. Then, when depressing the start key 209, the previously dialed phone number is redialed.

The voice key 206 is used to activate a voice-search function, which is a voice-activated function for stored phone numbers or various functions. The manner key 208 is used to set the telephone for manner mode which is a silent operation mode such that a confirmation sound is not made when a key is depressed, a silent vibration alert indicating the occurrence of an incoming call is produced instead of the audible alert. The center key 202 functions as a menu key in any of the operation states. In the case of menu mode, menu items are displayed on the display 117 and one of the menu items can be selected by operating the left-arrow and right-arrow keys 201 and 202.

In the incoming call state, the center key 202 and the power key 207 function respectively as the menu key and the power on/off key without changing in logical role among the standby state, the quick-silence function ON state, and the any key answer function ON state. The manner key 208 changes in logical function from the manner mode key to a manner mode and message key when the operation mode changes from the standby state to the incoming call state. In the incoming call state, the logical function of the manner key 208 is kept at the manner mode and message key regardless of whether the operation mode is in the quick-silence function ON state or the any key answer function ON state. The manner mode and message key functions such that a message of the caller is recorded in the manner mode. The start key 209 changes in logical function from the calling key to a response key, or an off-hook key, when the operation mode changes from the standby state to the incoming call state. In the incoming call state the logical function of the start key 209 is kept at the response key regardless of whether the operation mode is in the quick-silence function ON state or the any key answer function ON state. The end key 211 changes in logical function from a nonfunctioning key to a response hold key for activating a repose holding function when the operation mode changes from the standby state to the incoming call state. In the incoming call state, the logical function of the end key 211 is kept at the response hold key regardless of whether the operation mode is in the quick-silence function ON state or the any key answer function ON state.

On the other hand, the respective logical functions of the left-arrow key 201, the right-arrow key 203, the backtrack key 204, the voice key 206, the redial key 210, the ten-key pad 205 change depending on whether the operation mode is in the quick-silence function ON state or in the any key answer function ON state. In the any key answer function ON state, these keys 201, 203–206, and 210 function as the response key as in the case of the start key 209. In the quick-silence function ON state, however, when the audible alert is being generated, these keys 201, 203–206, and 210 function as the silence key and, after stopping the audible alert, these keys 201, 203–206, and 210 do not function.

Figure 4:
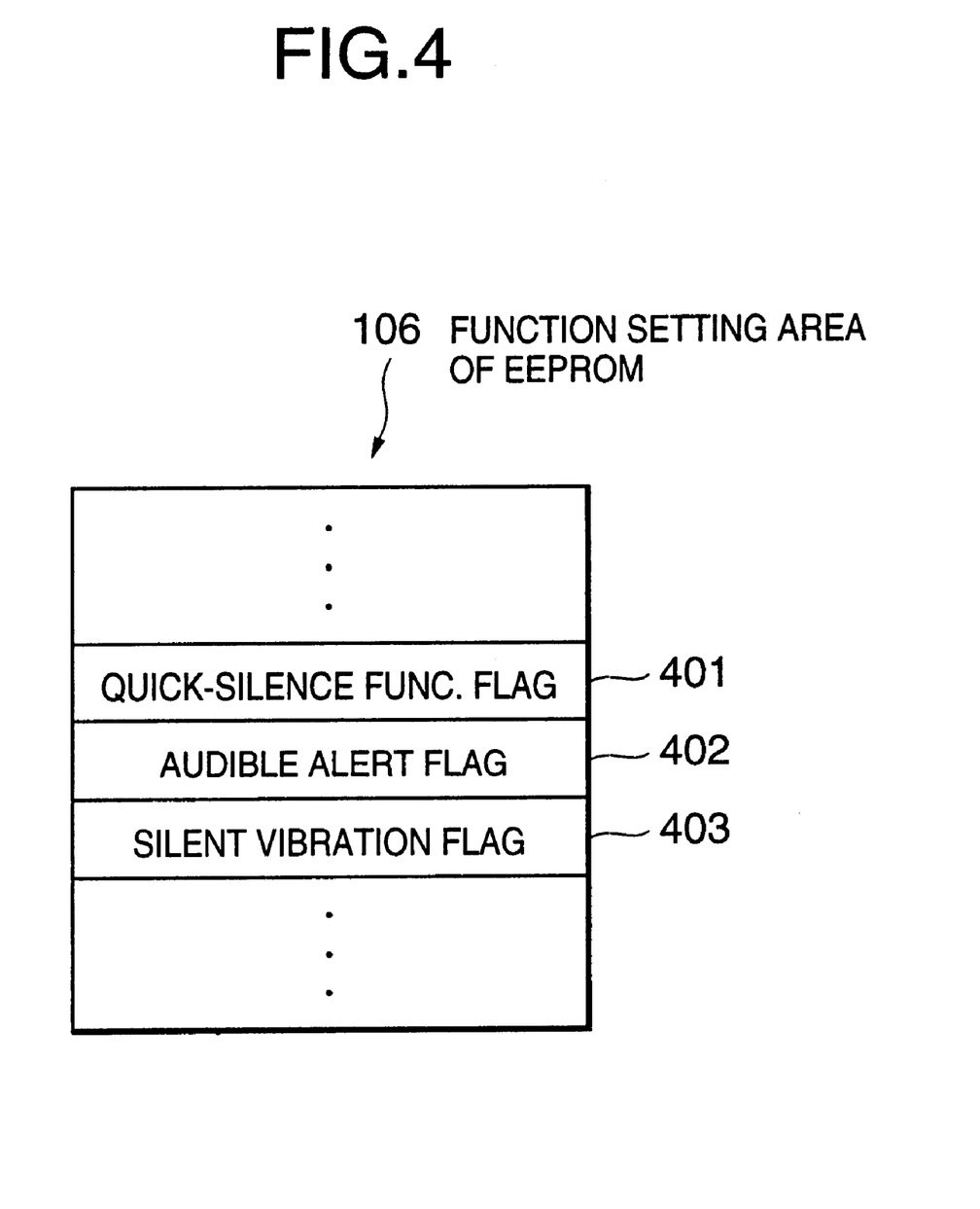
FIG. 4 is a format diagram showing a function setting area of an BEPROM included in the portable telephone as shown in FIG. 1.

Referring to FIG. 4, the EEPROM 106 stores the function setting data of the quick-silence/any-key function, the audible alert, and the silent vibration alert, which are used by the control unit 103 to control the respective functions.

As shown in FIG. 4, the function setting area includes a quick-silence function flag 401, an audible alert flag 402, and a silent vibration flag 403. In the case where the quick-silence function flag 401 is set, the quick-silence function is set to "ON" and the any key answer function to "OFF". Contrarily, in the case where the quick-silence function flag 401 is reset, the quick-silence function is set to "OFF" and the any key answer function to "ON". In the case where the audible alert flag 402 is set, alert is by the sounder 109 when an incoming call occurs. In the case where the audible alert flag 402 is reset, the sounder 109 does not function even when an incoming call occurs. In the case where the silent vibration flag 403 is set, the vibrator 113 is activated when an incoming call occurs. In the case where the silent vibration flag 403 is reset, the vibrator 113 does not function even when an incoming call occurs.

Figure 5:
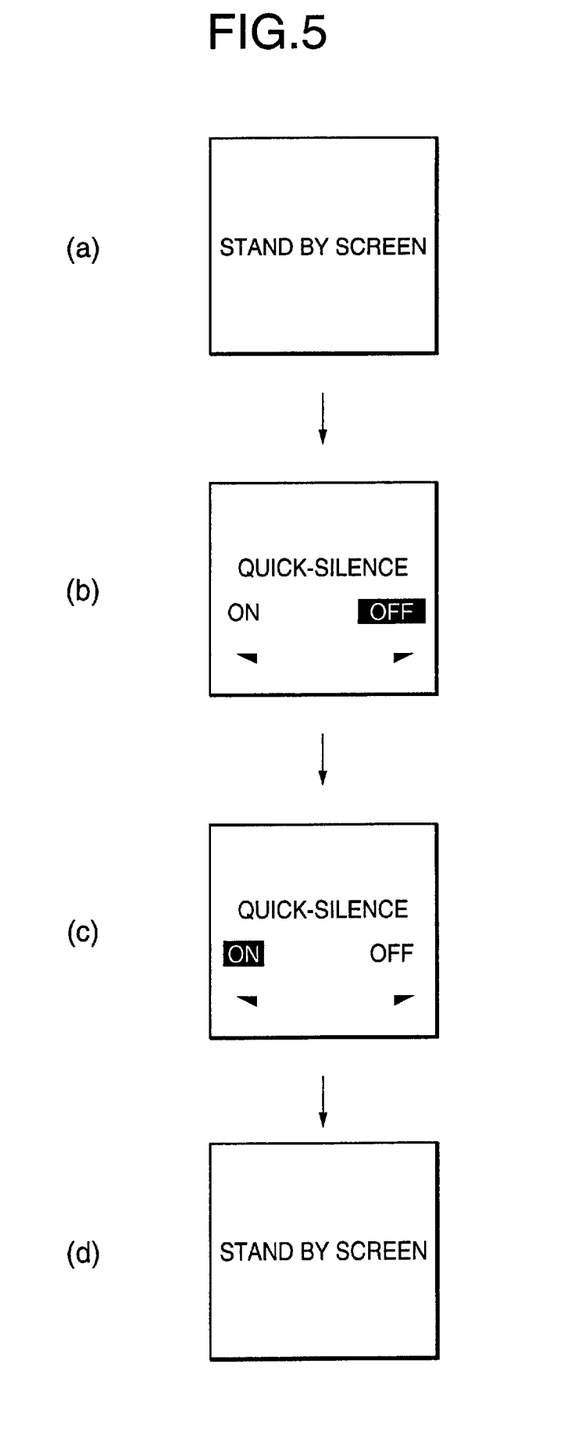
FIG. 5 is a diagram showing examples of display according to a Quick-silence setting operation.

As shown in FIG. 5, the quick-silence function flag 401 is set by the user operating the keys 201–203 and 211. In the standby screen as shown in FIG. 5(a), for example, date and the time of day are displayed on the display 117. In this standby screen, the user inputs a predetermined menu number by depressing the center key 202 followed by the corresponding numeral key of the ten-key pad 205. This causes the control unit 103 to start a quick-silence function setting program to display an operation screen on the display 117, as shown in FIG. 5(b). Here, since "OFF" is positioned by a highlight bar, the quick-silence function flag 401 is reset.

When the user depresses the left key 201 in such a state, the highlight bar is moved in the left direction and positions "ON" as shown in FIG. 5(c), which means that the quick-silence function flag 401 changes in setting state from Reset to Set. When the user depresses the right key 203 in such a state, the highlight bar is moved in the right direction back to "OFF" as shown in FIG. 5(b), which means that the quick-silence function flag 401 changes in setting state from Set to Reset.

In the state of the quick-silence function flag 401 setting as shown in FIG. 5(c), when the user depresses the end key 211, the quick-silence function is set to "ON" and the screen of the display 117 returns to the standby screen as shown in FIG. 5(d). Similarly, the other audible alert flag 402 and the silent vibration flag 403 can be set.

Figure 6:
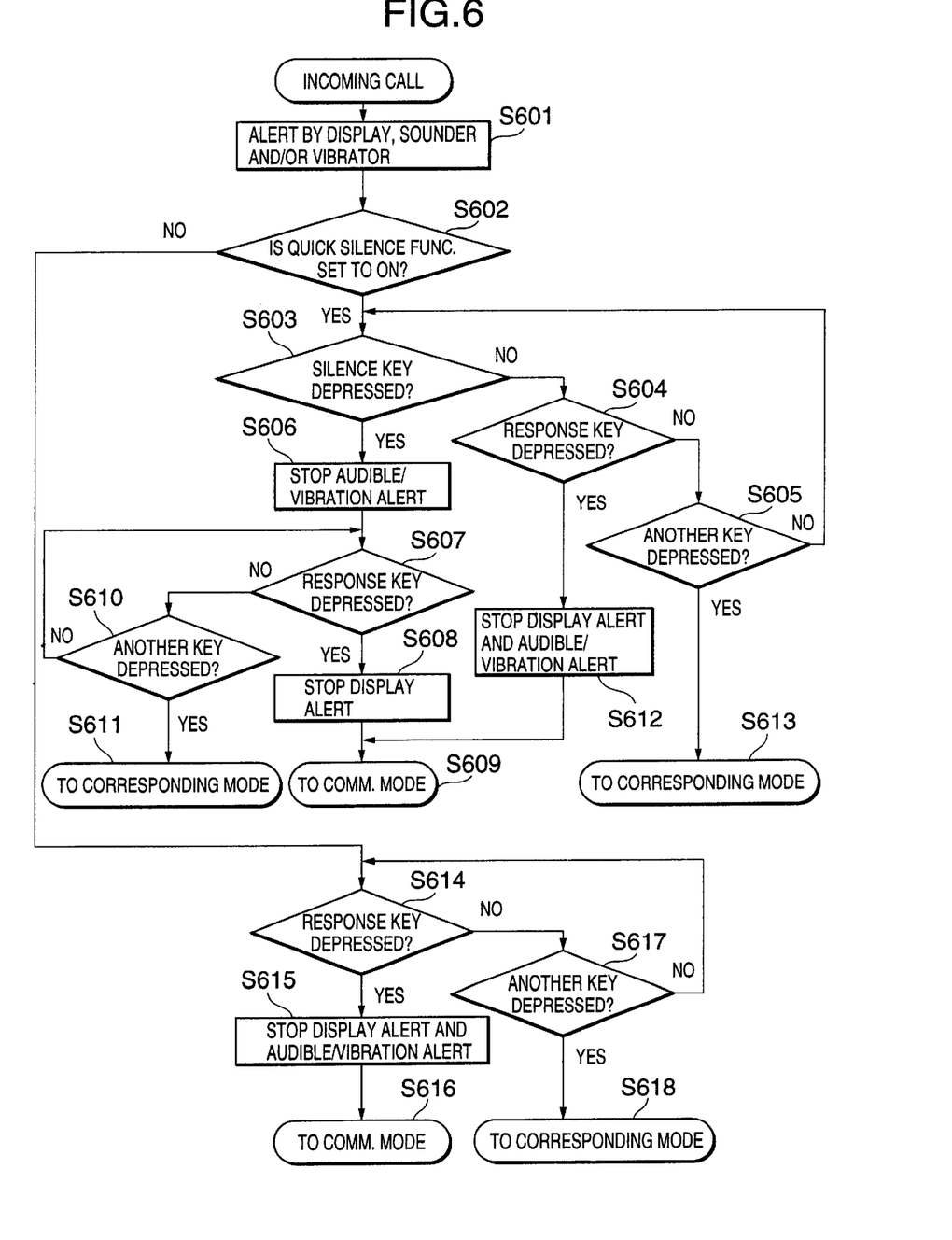
FIG. 6 is a flow chart showing a control operation when an incoming call occurs according to the present invention.

Referring to FIG. 6, when an incoming call occurs, the control unit 103 changes its operation mode from the standby state to an incoming-call state and starts the mode control according to the physical-logical key correspondence table as shown in FIG. 3.

In the case of the incoming-call state, the control unit 103 controls the driver 116 so that a predetermined mark indicating the occurrence of the incoming call is displayed on the display 117 and the lamp 118 blinks and, further selectively controls the sounder driver 108 and the vibrator drover 112 depending on the audible alert flag 402 and the silent vibration flag 403 of the EEPROM 106 (step S601).

Subsequently, the control unit 103 cheaks whether the quick-silence function flag 401 is in the set state (step S602). In other words, it is determined by checking the quick-silence function flag 401 whether the quick-silence function is set to "ON" and the any key answer function to "OFF".

In the case where the quick-silence function is set to "ON", and the any key answer function to "OFF" (YES In step S602), the control unit 103 waits for key input (steps S603–S605). When receiving a key code from the input device 107, the control unit 103 determines the logical function of the depressed physical key by referring to the physical-logical key correspondence table as shown in FIG. 3 and then performs the corresponding operation.

More specifically, in the incoming-call state and the audible alert state, as shown in FIG. 3, the respective logical functions of the left-arrow key 201, the right-arrow key 203, the backtrack key 204, the voice key 206, the redial key 210, the ten-key pad 205 function as the silence key. Therefore, when the user depresses any of these keys 201, 202–206 and 210 (YES in step S603), the control unit 103 stops the sounder 109 in the case of the audible alert and stops the vibrator 113 in the case of the silent vibration alert while maintaining the incoming call (step S606). At this time, the display alert is still displayed on the display 117. Since the incoming call is held, from the view of the base station calling this telephone, the calling operation continues.

After having stopped the alert, the control unit 103 waits for key input (steps S607 and 610). When receiving a key code from the input device 107, the control unit 103 determines the logical function of the depressed physical key by referring to the physical-logical key correspondence table as shown in FIG. 3. When the response key is depressed (YES in step S607), the display alert is stopped (step S608) and the control goes to the communication mode allowing conversation between the calling and called parties (step S609), since the alert is stopped in the quick-silence function ON state, only the start key 209 functions as the response key as shown in FIG. 3. When another key is depressed (YES in step S610), the operation mode is changed to the corresponding mode according to the physical-logical key correspondence table as shown in FIG. 3 (step S611). For example, when the end key 211 which now functions as the response hold key is depressed, the control unit 103 changes its operation mode to the response hold mode.

On the other hand, after the quick-silence function has been set to "ON" (YES in step S602), when the response key (here, the start key 209) is depressed (YES in step S604), the control unit 103 stops the display alert as well as the audible/vibration alert as in the case of the step S606 (step S612) and then changes its operation mode to the communication mode (step S609). When any key other than the response key and nonfunctioning keys is depressed (YES in step S605), the operation mode is changed to the corresponding mode (step S613). For example, when the end key 211 which now functions as the response hold key is depressed, the control unit 103 changes its operation mode to the response hold mode.

In the case where the quick-silence function is set to "OFF" and the any key answer function to "ON" (NO in step S602), the control unit 103 waits for key input (steps S614 and S617). When receiving a key code from the input device 107, the control unit 103 determines the logical function of the depressed physical key by ref erring to the physical-logical key correspondence table as shown in FIG. 3. When the response key is depressed (YES in step S614), the control unit 103 stops the display alert as well as the audible/vibration alert as in the case of the step S612 (step S615) and then changes its operation mode to the communication mode (step S616). As shown in FIG. 3, in this case, the physical keys 201, 203–206 and 210 function as the response key.

When a key other than the response keys is depressed (YES in step S617), the operation mode is changed to the corresponding mode (step S618). For example, when the end key 211 which now functions as the response hold key is depressed, the control unit 103 changes its operation mode to the response hold mode.

As described above, in the quick-silence function ON state and the any key answer function OFF state, when an incoming call occurs and the audible/vibration alert Is by the sounder/vibrator, the user can stop the alert by depressing a silence key while maintaining the incoming call. Since any of the keys 201, 203–206 and 210 functions as the silence key as shown in FIG. 3, the user can easily and rapidly stop the audible/vibration alert.

On the other hand, when the quick-silence function is set to "OFF" as shown in FIG. 5, the any key answer function is automatically set to "ON". In the any-key answer function ON state, any of the keys 201, 203–206 and 210 functions as the response key as shown in FIG. 3, allowing prompt off-hook operation. It should be noted that the line is disconnected when the calling party performs an on-hook operation before the response key is depressed and the control program shown in FIG. 6 is terminated.

A different assignment of the logical functions to the physical keys can be implemented by modifying the physical-logical key correspondence table as shown in FIGS. 7–11.

Figure 7:
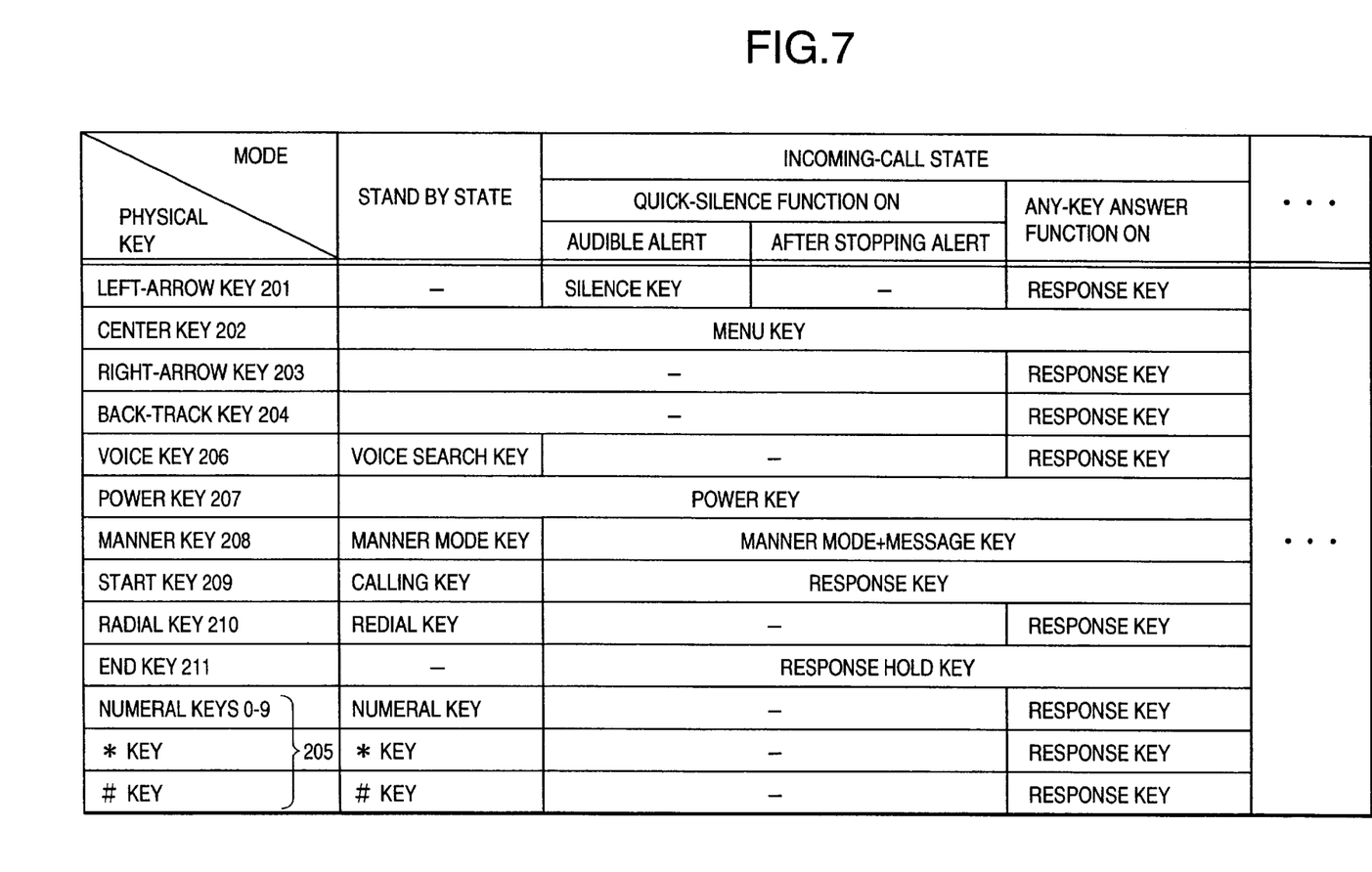
FIG. 7 is a diagram showing an example of a table for the correspondence of physical keys and logical keys according to a second embodiment of the present invention.

As shown in FIG. 7, in the case of the audible-alert state in the quick-silence function ON state, the silence key is assigned to only the left-arrow key 201 and other keys 203–205 and 210 do not function. The remaining operations are the same as the case of FIG. 3 and the control flow for the table of FIG. 7 is the same as FIG. 6.

Figure 8:
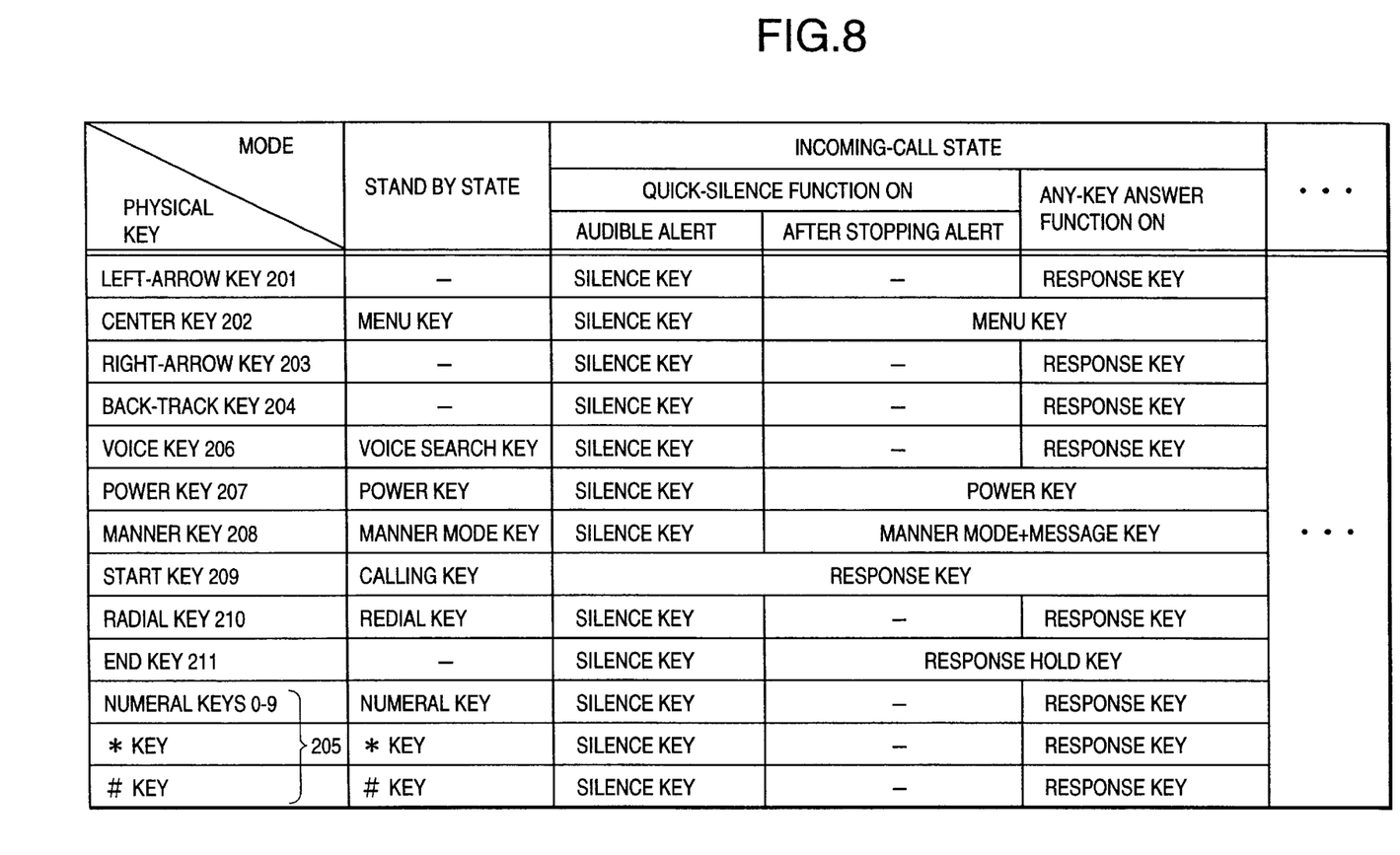
FIG. 8 is a diagram showing an example of a table for the correspondence of physical keys and logical keys according to a third embodiment of the present invention.

As shown in FIG. 8, all the keys other than the start key 209 may function as the silence key in the case of the audible-alert state in the quick-silence function ON state. In this case, it is necessary to modify the control flow as follows.

Since only the start key 209 function as the response key after the quick-silence function has been set to "ON" (YES in step S602), the steps S605 and S613 are deleted from FIG. 6 and, when the response key is not depressed (NO in step S604), the control goes back to the step S603. Therefore, in the case where the quick-silence function is set to "ON" and the any key answer function to "OPP" (YES in step S602), the control unit 103 waits for key input (steps S603 and S604) and, as shown in FIG. 8, the respective logical functions of all the keys other than the start key 209 function as the silence key. When the user depresses the silence key (YES in step S603), the control unit 103 stops the sounder 109 in the case of the audible alert and stops the vibrator 113 in the case of the silent vibration alert while maintaining the incoming call (step S606). After having stopped the alert, the control unit 103 waits for key input (steps S607 and 610). When the response key (here, only the start key 209 as shown in FIG. 8) is depressed (YES In step S607), the display alert is stopped (step S608) and the control goes to the communication mode allowing conversation between the calling and called parties (step S609). When another key is depressed (YES in step S610), the operation mode is changed to the corresponding mode according to the physical-logical key correspondence table as shown in FIG. 3 (step S611). The following control operation is the same as in the case of FIG. 3.

Figure 9:
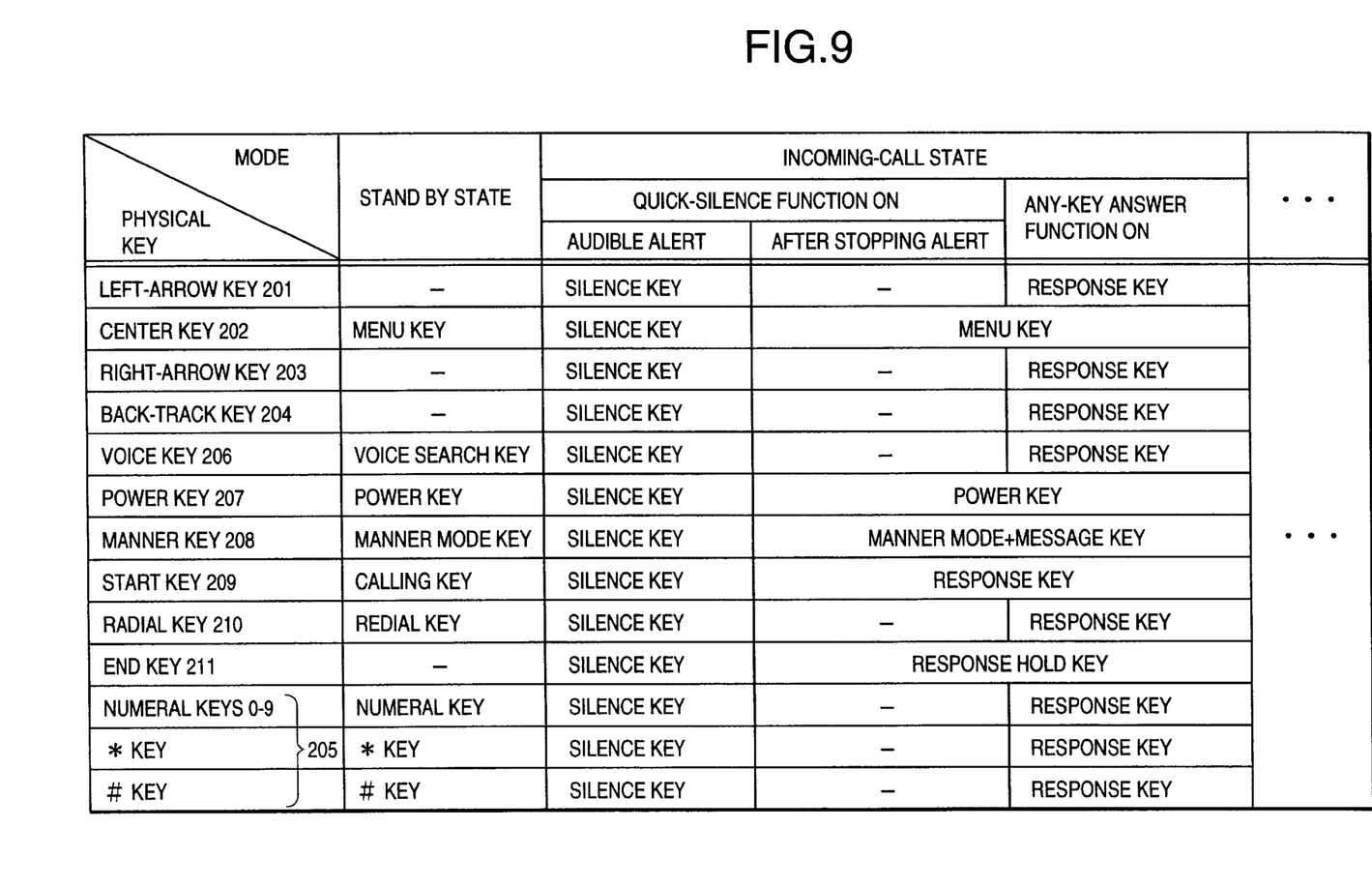
FIG. 9 is a diagram showing an example of a table for the correspondence of physical keys and logical keys according to a fourth embodiment of the present invention.

As shown In FIG. 9, all the keys 210–211 may function as the silence key in the case of the audible-alert state in the quick-silence function ON state. In this case, it is necessary to modify the control flow as follows.

Since no key functions as the response key after the quick-silence function has been set to "ON" (YES in step S602), the steps S604, S605, S612 and S613 are deleted from FIG. 6 and, the control unit 103 waits for the silence key to be depressed. In other words, the control unit 103 waits for any of the keys 210–211 to be depressed. When any of the keys 210–211 is depressed (YES in the step S603), the control unit 103 stops the audible/vibration alert (step S606) and changes its operation mode to the alert stopped state. The following control operation is the same as in the case of FIG. 3. Therefore, if the user wants to respond to the incoming call, then the user depresses any key followed by the start key 209.

After having stopped the audible/vibration alert, the response key may be assigned to a plurality of physical keys.

Figure 10:
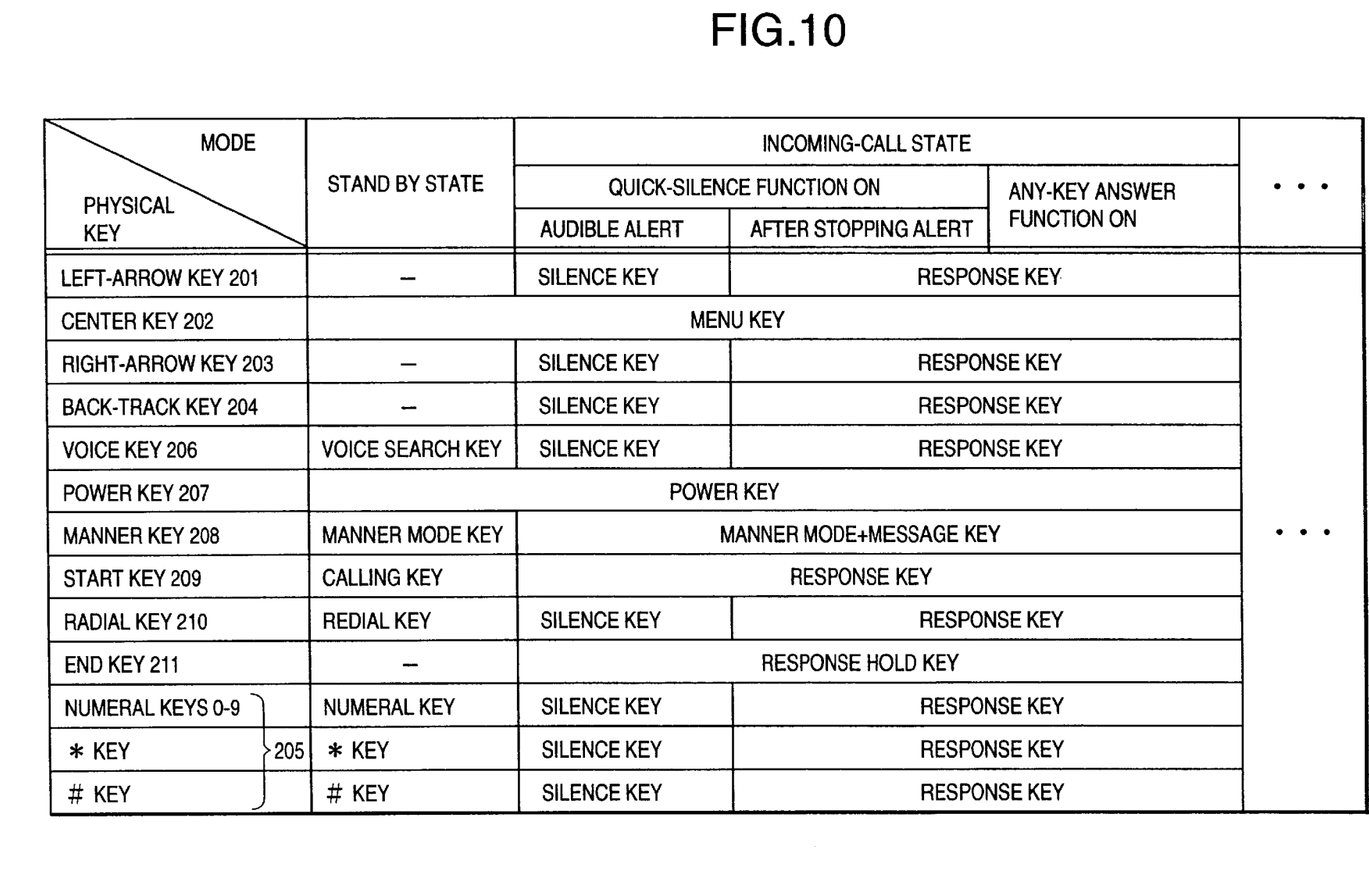
FIG. 10 is a diagram showing an example of a table for the correspondence of physical keys and logical keys according to a fifth embodiment of the present invention.

As shown in FIG. 10, in the case of the audible-alert state in the quick-silence function ON state, the silence key is assigned to the physical keys 201, 203–206 and 210 as in the case of FIG. 3. After having stopped the audible/vibration alert by depressing the silence key, however, these keys 201, 203–206 and 210 function as the response key. The remaining assignments are the same as the case of FIG. 3 and the control flow for the table of FIG. 10 is the same as FIG. 6.

Figure 11:
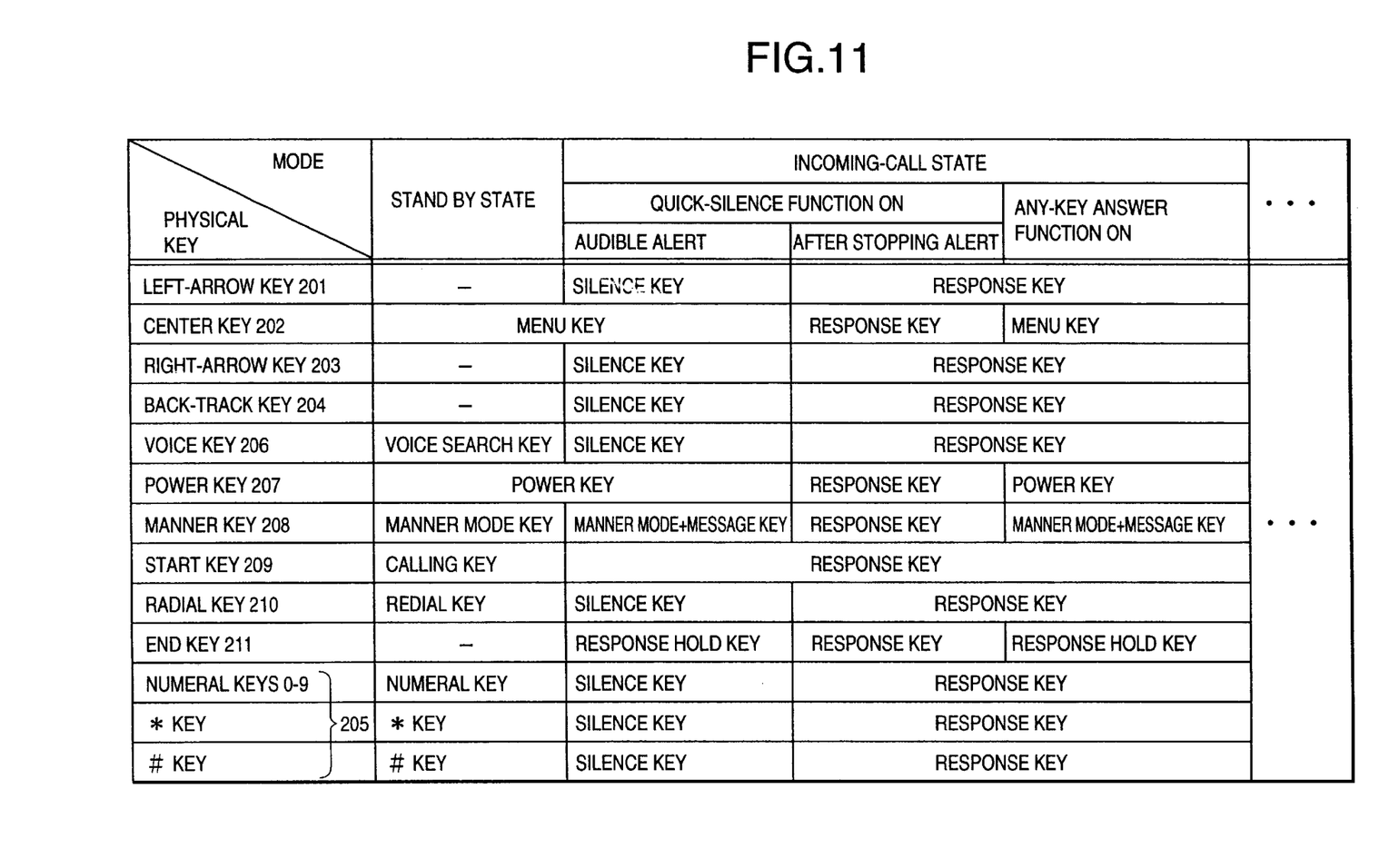
FIG. 11 is a diagram showing an example of a table for the correspondence of physical keys and logical keys according to a sixth embodiment of the present invention.

As shown in FIG. 11, in the case of the audible-alert state in the quick-silence function ON state, the silence key is assigned to the physical keys 201, 203–206 and 210 as in the case of FIG. 3. After having stopped the audible/vibration alert by depressing the silence key, however, all the keys 201–211 function as the response key. Although the remaining assignments are the same as the case of FIG. 3, the control flow for the table of FIG. 10 is modified as follows. Namely, in the control flow of FIG. 6, the steps S610 and S611 are deleted.

In the above embodiments, the present invention is applied to the portable telephone which is provided with the input device 107 having the physical keys 201–211. Alternatively, as the input device 107, a touch-sensitive panel on the LCD may be employed. More specifically, the display 117 having the touch-sensitive panel thereon displays a layout of keys respectively corresponding to the physical keys 201–211 as a screen. The user touches a position corresponding to a desired function/numeral/symbol key to input desired data or instruction.

In the case where the portable telephone has a key invalidating function to avoid undesired key operations which may occur, for example, in a bag, when the key invalidating function is set, all the keys other than the start key 209 and the end key 211 are invalid. In other words, the key invalidating function is given priority over the quick-silence function and the any key answer function.

Further, the present invention can be also applied to a mobile communication device such as an automobile telephone, a cellular telephone, a digital cordless telephone such as PHS (personal handy-phone system).

What is claimed is:

1. A portable communication apparatus comprising:
    an alert device for producing an alert when an incoming call occurs;
    an input device having a plurality of keys;
    a key function changer for changing logical functions of the plurality of keys based on a predetermined rule depending on a change in operation mode of the portable communication apparatus, said key function changer comprising a first memory for storing function setting data including a quick-silence function flag and a second memory storing a table of correspondence between the plurality of keys and a plurality of the logical functions for each of an alert operation and alert stopped modes in a case where the quick-silence function flag is set, wherein the controller determined, referring to the function setting data and the table, whether the key having the predetermined logical function is operated; and
    a controller controlling the alert device producing the alert to stop the alert while holding the incoming call when a key having a predetermined logical function is operated.

2. A portable communication apparatus according to claim 1, wherein a quick-silence function is set to ON and an any-key answer function is set to OFF when the quick-silence function flag is set, and the quick-silence function is set to OFF and the any-key answer function is set to ON when the quick-silence function flag is reset.

* * * * *